May 12, 1936.  L. A. BIXBY  2,040,594
REMOTE CONTROL FOR TRANSMISSIONS
Filed Feb. 24, 1934   3 Sheets-Sheet 1
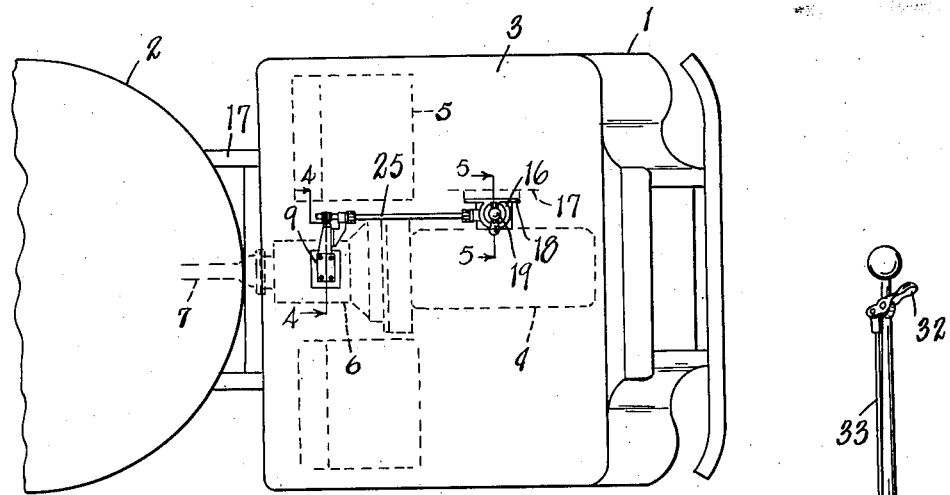
Fig. 1
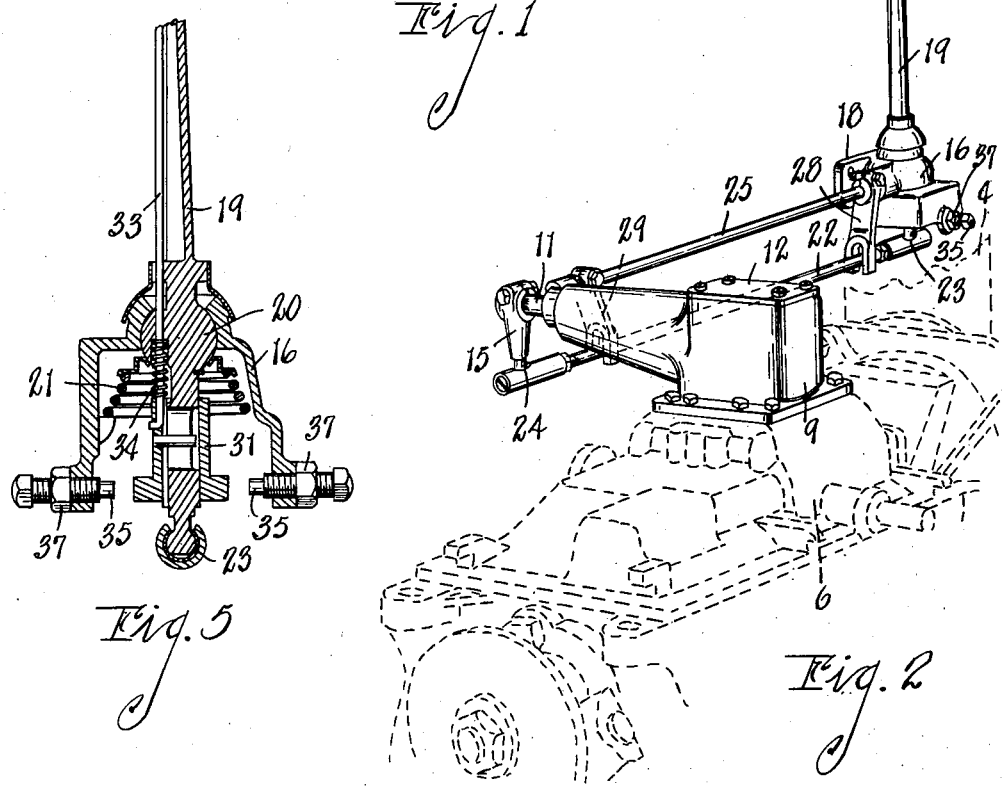
Fig. 5
Fig. 2
INVENTOR
Leo A. Bixby
BY Chappell Earl
ATTORNEYS

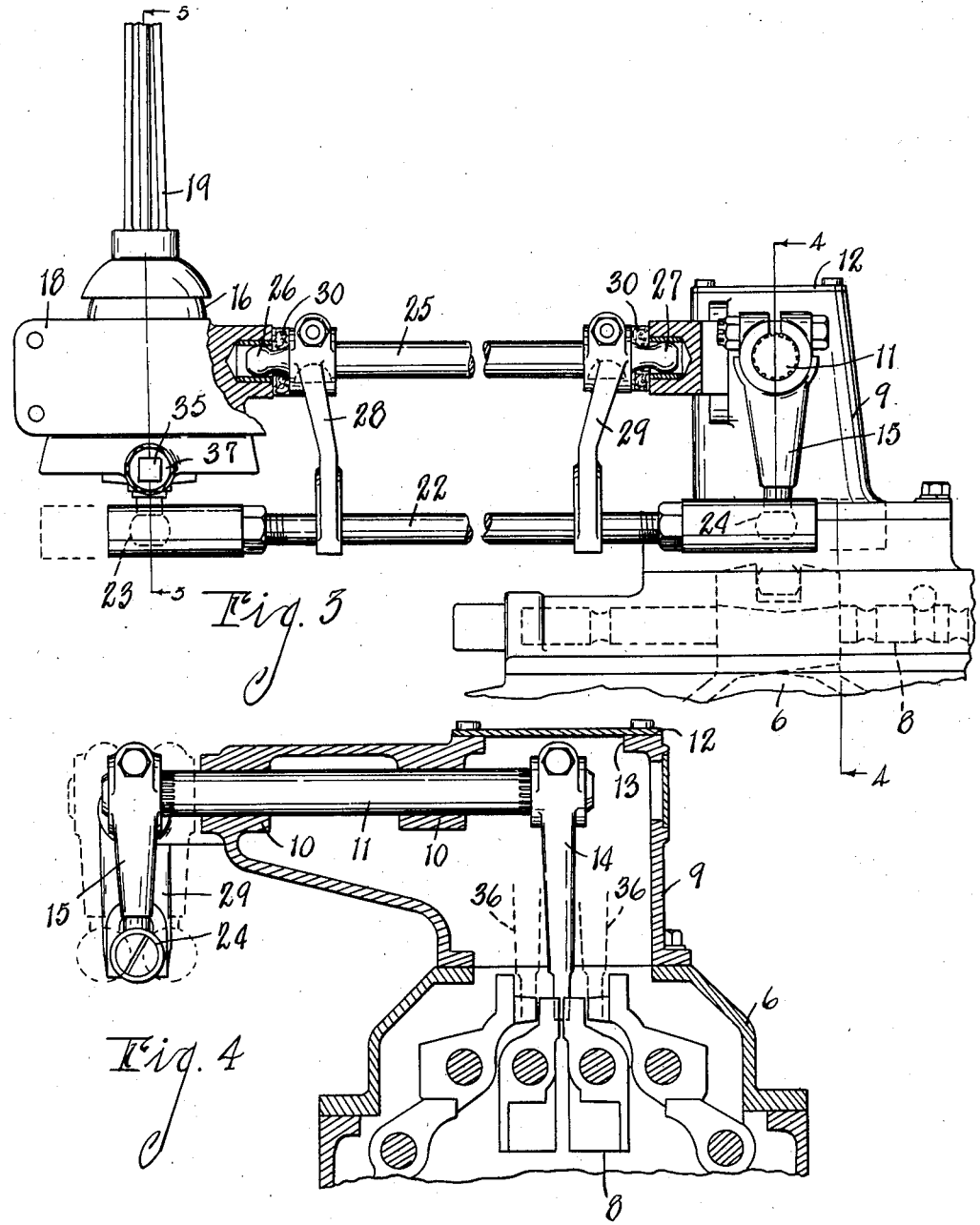

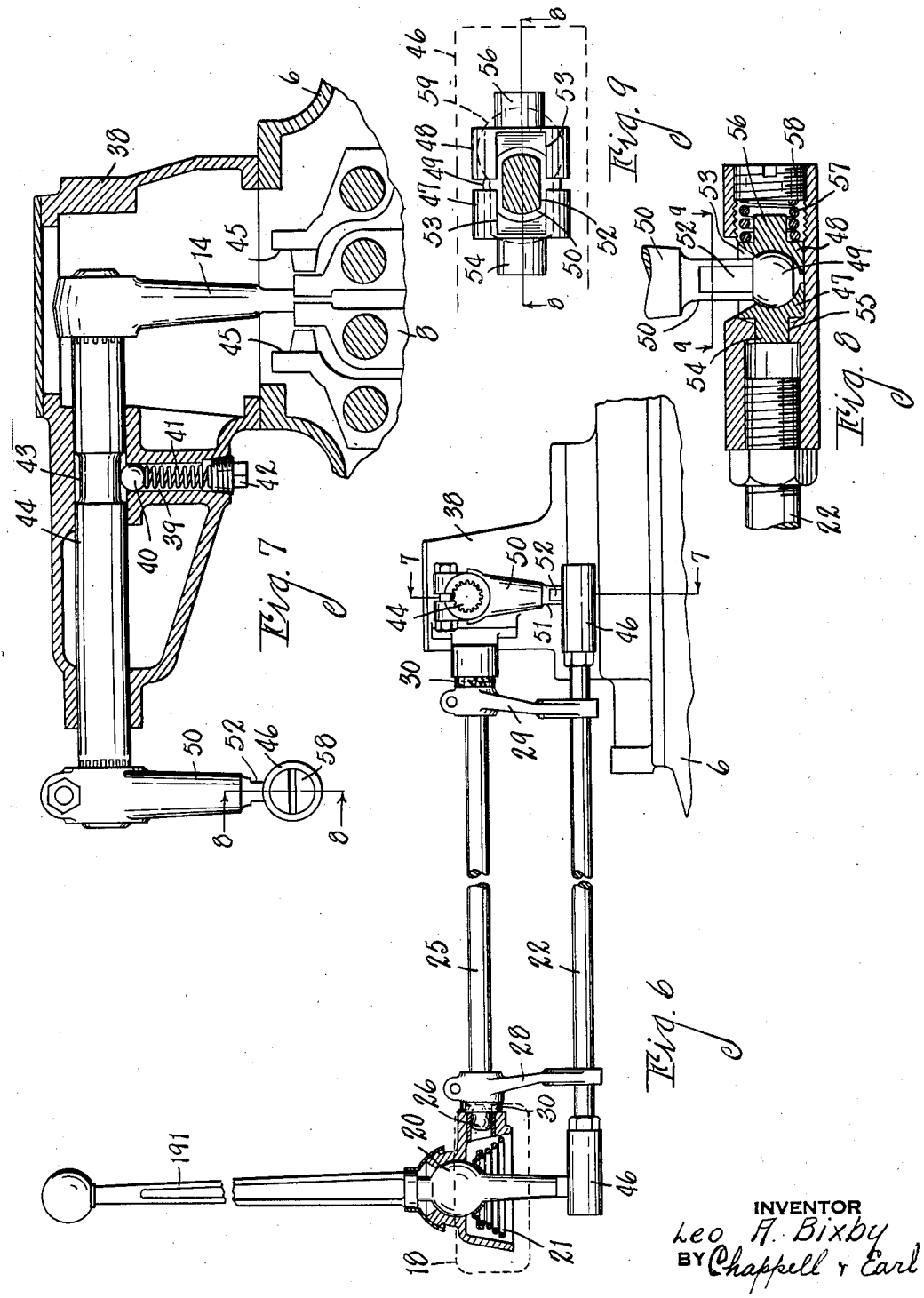

Patented May 12, 1936

2,040,594

UNITED STATES PATENT OFFICE 2,040,594

REMOTE CONTROL FOR TRANSMISSIONS

Leo A. Bixby, Kalamazoo, Mich., assignor to Fuller Manufacturing Company, Kalamazoo, Mich.

Application February 24, 1934, Serial No. 712,784

11 Claims. (Cl. 74—473)

The main objects of this invention are:

First, to provide an improved remote control for motor vehicle transmissions which permits locating of the driver's seat at the extreme front of the vehicle, thereby permitting the use of space now commonly occupied by the cab for loading space.

Second, to provide a remote control of this character, the shift positions of which are in duplication of the shift positions when the control lever is mounted directly on the transmission housing itself.

Third, to provide a remote control which occupies a minimum amount of space and one which is positive in operation and eliminates lost motion as far as possible.

Fourth, to provide a remote control which is simple and economical in its parts, the parts being arranged and mounted so that misalinement and frame twist will not affect the shifting nor cause bending thereof.

Fifth, to provide a remote control provided with adjustable positive latch-out positions for reverse and low speeds.

Sixth, to provide a remote control having these advantages which is very easy to operate.

Seventh, to provide a remote control of the character described which may be easily installed and is capable of wide adaptation to accommodate peculiarities in frame or chassis construction.

Eighth, to provide a transmission control having shift positioning means adapted to automatically release in response to additional force applied to the shift lever in the direction of desired movement thereof.

Ninth, to provide an improved joint especially well adapted for use in my transmission control and for use in automobile steering mechanisms and the like.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary top plan view of a truck embodying the features of my invention.

Fig. 2 is an enlarged fragmentary perspective view of my remote control mechanism, portions of the vehicle being shown in dotted lines.

Fig. 3 is an enlarged fragmentary view in side elevation.

Fig. 4 is an enlarged fragmentary transverse vertical section on a line corresponding to line 4—4 of Figs. 1 and 3.

Fig. 5 is an enlarged fragmentary transverse vertical section on a line corresponding to line 5—5 of Figs. 1 and 3.

Fig. 6 is a fragmentary view in side elevation of a modification of my invention, portions being broken away and shown in section.

Fig. 7 is an enlarged fragmentary transverse section on a line corresponding to line 7—7 of Fig. 6.

Fig. 8 is a detail section on a line corresponding to line 8—8 of Figs. 7 and 9, showing my improved joint.

Fig. 9 is a section on a line corresponding to line 9—9 of Fig. 8, the casing being shown partially by dotted lines.

In the embodiment of my invention illustrated by Figs. 1 to 5 of the drawings, numeral 1 indicates a truck or tractor having a body or trailer 2 associated therewith. The driver's cab or compartment 3 is located in the extreme front end of the truck directly over the engine 4, the driver's seat being indicated at 5. The transmission housing 6 is conventionally located between the engine and the propeller shaft 7. A gear shifting mechanism indicated generally by the numeral 8 is disposed within the housing 6.

On the transmission housing 6, I mount a transverse shaft housing 9 of the shape illustrated, the shaft housing being provided with spaced horizontal bearings 10, 10 in which the actuated selecting and shifting shaft 11 is journaled for axial as well as rotary movement. A removable closure 12 is provided for affording access to the interior of the housing 9 through the opening 13 at the top thereof. A depending gear shifting arm 14 is secured to the inner end of the shaft 11 for coaction with the gear shifting mechanism 8. Secured to the outer end of the shaft is a depending arm or crank 15.

The control lever housing 16 is secured to the frame 17 of the truck by means of the integral plate 18. The control lever housing is mounted in substantially fixed transversely and longitudinally offset relation to the gear shifting member 14 at substantially the same level as the shaft housing 9. The gear shift or control lever 19 is pivotally mounted within the housing 16 by the ball and socket joint 20, the compression spring 21 holding the parts in assembled relation. The lower end of the gear shift control lever 19 is connected to the lower end of the crank 15 by means of the connecting rod 22, the ends of the connecting rod being connected to the lower ends of the arm and control lever by ball and socket joints 23 and 24, respectively.

In substantially the horizontal plane of the transverse shaft 11 and in spaced parallel relation to the connecting rod 22, I arrange a rockshaft 25 having its ends supported by means of ball and socket bearings 26 and 27, respectively, to the control lever housing 16 and the shaft housing 9. Spaced arm forks 28 and 29 are fixed to the rockshaft 25 and engage the connecting rod for insuring equilateral movement of the ends of the latter. Lubricant retaining gaskets 30, 30, are disposed between the inner ends of the forks and the transverse shaft and control lever housings. The mounting of rockshaft 25 in ball and socket joints obviously makes for flexibility providing against twisting strains.

With the parts thus arranged, the gear shifting member 14 faithfully follows the movement of the lower end of the gear shift control lever 19. My improved control mechanism may be applied to any standard gear shifting mechanism without alteration. The control is capable of operating any number of forward speed or reverse speed gear shifts.

For positively latching out the reverse and low speed positions of the gear shift control lever 19, I provide the lower end of the latter with a sleeve 31 adapted to be longitudinally elevated by the finger piece 32 through the link 33. The compression spring 34 arranged on the link 33 holds the sleeve 31 in its lower initial position so as to engage the adjustable stops 35, 35 disposed in opposite sides of the housing 16 when it is attempted to swing the control lever too far to one side or the other. By depressing the finger piece 32, however, the sleeve 31 is elevated so as to clear the stops 35, thereby permitting the gear shift control lever to be swung to its extreme lateral position. In such position, the gear shifting member 14 is adapted to coact with the reverse or low speed shifting rod. The extreme opposite lateral positions of the gear shifting member 14 are illustrated in Fig. 4 by the dotted lines 36, 36. The shanks of the abutments or stops 35 are threaded in the walls of the control lever housing 16 for longitudinal adjustment and are provided with lock nuts 37, 37 for holding them in adjusted position.

Referring to Figs. 6 to 9, inclusive, there is illustrated a modification of my invention wherein the cover 38 is provided with a bore 39 in which are housed the ball detent 40, compression spring 41 and closure plug 42. The ball coacts with the ends of the annular recess 43 in the shifting shaft 44 to provide positioning means for releasably limiting the axial movement thereof. The arrangement, however, is such that the operator can continue the shifting movement by merely exerting additional force on the lever 45 sufficient to overcome the holding force of the spring 39. In this case the final stop is provided by the coaction of the arm 14 with the member 45 of the transmission 8.

My improved joint comprises a casing 46 on the end of the connecting rod 22, in which is disposed a pair of ball-socket members 47 and 48 receiving between them the spherical end 49 of the crank 50. The sides of the portion 51 of the crank are cut away at 52 for coaction with the upper slots 53 in the members 47 and 48 so that the crank is free to swing in a plane passing through the axis of the connecting rod. Rotational movement of the connecting rod is permitted by the action of the ball and socket connection to a certain extent and by the rotary connection between the members 47 and 48 and the casing 46, the former being free to rotate within the latter. The stem 54 of the member 47 is journaled in the bearing 55 of the casing, while the stem 56 of the member 48 constitutes a guide for the compression spring 57 backed by the closure plug 58. The ball 49 cannot pull out of the socket formed by the members 47 and 48 owing to the fact that the diameter of the ball 49 is greater than the width of the slots 53. This is a very desirable feature of my invention, inasmuch as it prevents serious accidents. My joint is readily applicable to other relations, such as automobile steering mechanisms and the like. The casing 46 has a conventional key-hole opening 59 for the passage of the ball 49 in the assembly of the device.

In the embodiment shown in Fig. 6, the latching means for the control lever 191 is omitted, and it is found that in practice with the assembly such as illustrated, the latching means is not essential to the maintaining of the parts in adjusted position.

My improved remote control enables the positioning of the driver's seat at any distance from the transmission. At the same time, my remote control is easy to operate, the gear shift lever being manipulated in the same manner as the shifting lever in well standardized types of transmissions. The wracking and twisting of the frame under stresses of use does not affect the operation of the transmission control, and further, it is comparatively compact and may be installed in relatively restricted space.

Certain States have enacted laws limiting the overall length of load carrying vehicles or trucks on public highways and the present trend is toward carrying as heavy loads as possible. This positioning of the driver enables the use of space commonly occupied by a cab or driver for load space. I am aware that this positioning of the driver at the side or above the engine is an old practice, but older types of remote controls were cumbersome in structure, were difficult to install, were not adaptable to different structures or assemblies and were very difficult to operate, sometimes becoming elements of danger because of such difficult operation.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

1. A remote control for transmissions comprising a shaft housing, an actuated selecting and shifting shaft mounted in said housing for axial and rotary movement, a depending gear shifting member at the inner end of said shaft, a depending arm on the outer end of said shaft, a control lever housing, a gear shift control lever mounted in said control lever housing, a connecting rod having ball and socket joint connections to said control lever and to said arm on said shaft, a selecting rockshaft arranged in spaced parallel relation to said connecting rod and connected at its ends to said housings by ball and socket bearings, and forks fixed to said rockshaft and engaging said connecting rod adjacent the ends thereof.

2. A remote control for transmissions comprising a shaft housing adapted to be mounted on a transmission housing to project transversely therefrom, an actuated selecting and shifting shaft mounted in said housing for axial and rotary movement, a depending gear shifting member at the inner end of said shaft, a depending arm on the outer end of said shaft, a control lever housing mounted in a substantially spaced fixed relation to said shaft housing, a gear shift control lever mounted in said control lever housing, a connecting rod joining said control lever and arm on said shaft, a selecting rockshaft arranged in the horizontal plane of said actuated shaft and in spaced parallel relation to said connecting rod, and forks fixed to said rockshaft and engaging said connecting rod adjacent the ends thereof, said connecting rod being selectively movable to axially shift or rotate said actuated shaft, said forks insuring equilateral movement at all points of said connecting rod.

3. A remote control for transmissions comprising a shaft housing, an actuated selecting and shifting shaft mounted in said housing for axial and rotary movement, a depending gear shifting member at the inner end of said shaft, a depending arm on the outer end of said shaft, a control lever housing, a gear shift control lever mounted in said control lever housing, a connecting rod joining said control lever and arm on said shaft, a selecting rockshaft arranged in spaced parallel relation to said connecting rod, and forks fixed to said rockshaft and engaging said connecting rod adjacent the ends thereof, said connecting rod being selectively movable to axially shift or rotate said actuated shaft, said forks insuring equilateral movement at all points of said connecting rod.

4. A remote control for transmissions comprising an actuated selecting and shifting shaft mounted for axial and rotary movement, a gear shifting member at the inner end of said shaft, an arm on the outer end of said shaft, a gear shift control lever, a connecting rod having ball and socket joint connections to said control lever and to said arm on said shaft, housings for said shaft and control lever, a selecting rockshaft arranged in spaced parallel relation to said connecting rod and connected at its ends to said housings by ball and socket bearings, and forks fixed to said rockshaft and engaging said connecting rod.

5. A remote control for transmissions comprising an actuated selecting and shifting shaft mounted for axial and rotary movement, a gear shifting member at the inner end of said shaft, an arm on the outer end of said shaft, a gear shift control lever, a connecting rod joining said control lever and arm on said shaft, a selecting rockshaft arranged in spaced parallel relation to said connecting rod, and forks fixed to said rockshaft and engaging said connecting rod, said connecting rod being selectively movable to axially shift or rotate said actuated shaft, said forks insuring equilateral movement at all points of said connecting rod.

6. In a remote control for transmissions, the combination of an actuated selecting and shifting element mounted for axial and rotative movement, said actuated element having an arm at its outer end, a remote control lever, a connecting rod having universal joint connection to said control lever and to said arm on said actuated element, a rockshaft disposed parallel to said connecting rod and having spherically curved journals at its ends, and arms on said rockshaft forked to engage said connecting rod adjacent the ends thereof whereby the said actuated element may be shifted axially and may be rocked through said control lever.

7. In a remote control for transmissions, the combination of an actuated selecting and shifting element mounted for axial and rotative movement, said actuated element having an arm at its outer end, a remote control lever, a connecting rod joining said control lever and arm on said actuated element, a rockshaft having arms engaging said connecting rod adjacent the ends thereof whereby the said actuated element may be shifted axially and may be rocked through said connecting rod and control lever.

8. The combination with a transmission including an actuated selecting and shifting shaft provided with an arm, of a control lever having a ball and socket bearing support, its lower end projecting below its bearing support, a connecting rod having ball and socket connections at its ends to the lower end of said control lever and to the lower end of said arm on said actuated shaft, and a rockshaft disposed in spaced relation to said connecting rod and having ball and socket supports at its ends and provided with arms engaging said connecting rod for insuring equilateral movement of its ends whereby the end of the arm on said selecting and shifting shaft follows the movement of the lower end of said control lever.

9. The combination with a transmission including an actuated selecting and shifting shaft provided with an arm, of a control lever, a connecting rod connecting the lower end of said control lever to the lower end of said arm on said actuated shaft, and a rockshaft disposed in spaced relation to said connecting rod and provided with arms engaging said connecting rod for insuring equilateral movement of its ends whereby the end of the arm on said selecting and shifting shaft follows the movement of the lower end of said control lever, said connecting rod being movable to axially shift or rotate said shaft.

10. The combination with a transmission including an actuated selecting and shifting element provided with an arm, of a control lever mounted with its lower end projecting below its pivotal support, a connecting rod connecting the lower end of said control lever to said arm on said actuated element, and a rockshaft provided with arms engaging said connecting rod for insuring equilateral movement of its ends whereby the end of the arm on said selecting and shifting element follows the movement of the lower end of said control lever, said connecting rod being movable to axially shift or rotate said element.

11. In a remote control for transmissions including an actuated selecting and shifting element mounted for axial and rotative movement, the combination of a control lever, a connecting rod joining said control lever to said actuated element, and a rockshaft provided with arms engaging said connecting rod adjacent the ends thereof for insuring equilateral movement of its ends when the connecting rod is moved laterally through said control lever, said rockshaft having ball and socket supports at its ends.

LEO A. BIXBY.